(12) United States Patent
Fischer et al.

(10) Patent No.: US 11,512,149 B2
(45) Date of Patent: Nov. 29, 2022

(54) METHOD AND SYSTEM FOR PRODUCING A POLYMER

(71) Applicant: INEOS STYROLUTION GROUP GMBH, Frankfurt am Main (DE)

(72) Inventors: Wolfgang Fischer, Heidelberg (DE); Peter Ittemann, Dannstadt-Schauernheim (DE); Florian Patcas, Ludwigshafen (DE); Michael Ruf, Schwetzingen (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 286 days.

(21) Appl. No.: 16/338,848

(22) PCT Filed: Oct. 2, 2017

(86) PCT No.: PCT/EP2017/074941
§ 371 (c)(1),
(2) Date: Apr. 2, 2019

(87) PCT Pub. No.: WO2018/065347
PCT Pub. Date: Apr. 12, 2018

(65) Prior Publication Data
US 2021/0284760 A1    Sep. 16, 2021

(30) Foreign Application Priority Data

Oct. 4, 2016 (EP) .................................... 16192168

(51) Int. Cl.
*C08F 2/01*  (2006.01)
*C08F 2/06*  (2006.01)
(Continued)

(52) U.S. Cl.
CPC .................. *C08F 2/01* (2013.01); *C08F 2/06* (2013.01); *C08F 2/34* (2013.01); *C08F 212/10* (2013.01); *C08F 220/14* (2013.01); *C08F 220/44* (2013.01)

(58) Field of Classification Search
USPC ............................................ 526/68; 422/135
See application file for complete search history.

(56) References Cited

U.S. PATENT DOCUMENTS

| 3,597,498 A | 8/1971 | Christensen |
| 3,737,288 A | 6/1973 | Hochman |

(Continued)

FOREIGN PATENT DOCUMENTS

| CN | 104628925 A | 5/2015 |
| DE | 19752394 A1 | 5/1999 |

(Continued)

OTHER PUBLICATIONS

Becker et al., Jan. 26, 2001, Wiley-VCH, XP055504029, pp. 56-57.
(Continued)

*Primary Examiner* — Fred M Teskin
(74) *Attorney, Agent, or Firm* — Raphael Bellum PLLC

(57) ABSTRACT

A method for producing a polymer from a first component and a second component using a reactor (50) offers technical advantages, wherein reaction heat produced in the reactor (50) is discharged via a boiling cooler (40) by supplying gaseous vapors produced in the reactor (50) to the boiling cooler (40). A product flow containing condensed vapors is returned to the reactor (50) from the boiling cooler (40) via a separation vessel (60), and an aqueous phase is separated from the product flow in the separation vessel (60). A system is provided for producing a polymer from a first component and a second component, comprising a reactor (50) and a boiling cooler (40) for discharging reaction heat produced in (Continued)

the reactor (50). A separation vessel (60) is arranged between the boiling cooler (40) and the reactor (50) such that a product flow containing condensed vapors is returned to the reactor (50) from the boiling cooler (40) via the separation vessel (60).

15 Claims, 2 Drawing Sheets

(51) Int. Cl.
*C08F 2/34* (2006.01)
*C08F 212/10* (2006.01)
*C08F 220/14* (2006.01)
*C08F 220/44* (2006.01)
*B01J 19/18* (2006.01)

(56) References Cited

U.S. PATENT DOCUMENTS

| | | | | |
|---|---|---|---|---|
| 4,060,680 | A | * | 11/1977 | Hendy ............... C08F 220/44 526/89 |
| 4,555,384 | A | | 11/1985 | Morris et al. |
| 5,980,790 | A | * | 11/1999 | Kuwahara ............ C08F 212/08 526/71 |
| 6,428,199 | B1 | | 8/2002 | Rupaner et al. |
| 7,745,552 | B2 | | 6/2010 | Kiss et al. |
| 7,750,095 | B2 | | 7/2010 | Martin et al. |
| 8,148,480 | B2 | | 4/2012 | Carloff et al. |
| 2015/0011692 | A1 | | 1/2015 | Ittemann et al. |

FOREIGN PATENT DOCUMENTS

| | | |
|---|---|---|
| EP | 0865820 A1 | 3/1998 |
| EP | 1034201 A1 | 9/2000 |
| EP | 1297038 B1 | 8/2006 |
| EP | 2802619 B1 | 12/2012 |
| JP | 2009-7304 A | 1/2009 |
| WO | 99/25749 A1 | 5/1999 |

OTHER PUBLICATIONS

English Translation of International Preliminary Report on Patentability in International Application No. PCT/EP2017/074941, dated Apr. 18, 2019.

Mouaziz et al., "Synthesis of porous microspheres via self-assembly of monodisperse polymer nanospheres", J. Mater. Chem., 2004, 14, pp. 2421-2424.

Yamada et al., "Microwave-assisted solution polycondensation of L-lactic acid using a Dean-Stark apparatus for a non-thermal microwave polymerization effect induced by the electric field", Polym. Chem., 2014, 5, pp. 5283-5288.

* cited by examiner

METHOD AND SYSTEM FOR PRODUCING A POLYMER

BACKGROUND OF THE INVENTION

The invention relates to a process for producing a polymer from at least one first component and a second component by means of a reactor, where heat of reaction arising in the reactor is removed by means of an evaporative cooler by feeding gaseous vapor formed in the reactor to the evaporative cooler. The invention also relates to a system for producing a polymer from at least one first component and a second component, which comprises a reactor and an evaporative cooler for removing heat of reaction arising in the reactor.

The production of polymers, in particular styrene-copolymers such as styrene-acrylonitrile copolymer (SAN) or alpha-methylstyrene-acrylonitrile copolymer (AMSAN) in a reactor having a stirrer is known. Such a reactor is also referred to as "CSTR" (continuous stirred tank reactor) in the literature. Here, at least two components, in particular monomers, are fed to the reactor and a polymerization then takes place within the reactor.

EP-B 1297038 discloses the production of rubber-containing styrene polymers such as acrylonitrile-butadiene-styrene (ABS) or acrylonitrile-styrene-acrylate (ASA) composed of a rubber phase and a hard phase. Suitable hard phases here are, in particular, styrene-acrylonitrile copolymer (SAN) and alpha-methylstyrene-acrylonitrile copolymer (AMSAN). The hard phase is produced by polymerization of monomers.

A thermoplastic molding composition having, inter alia, a terpolymer as component is known from EP-B 2802619. The terpolymer here contains acrylonitrile (AN), alpha-methylstyrene and styrene (S). The terpolymer is produced in this case by reacting the monomers in a free-radical solvent polymerization at temperatures of from 100° C. to 140° C. and subsequently reducing the residual monomer content to less than 3000 ppm at a pressure of less than 50 mbar in a shell-and-tube reactor.

A reactor for polymerization is disclosed, for example, in EP-A 0865820. The reactor comprises a lid, a bottom and a stirrer. The reactor comprises feed conduits via which the components are introduced into the reactor. The polymerization takes place in the reactor and the polymer formed is taken from the reactor via discharge conduits.

Methods and systems for producing polymers are also known from the patent specifications U.S. Pat. Nos. 3,737,288, 7,745,552, 7,750,095, 8,148,480 and EP-A 1034201, or WO 99/25749.

The polymerization is generally an exothermic reaction, and heat of reaction arises. The heat of reaction which arises is, for example, removed by means of an evaporative cooler. As evaporative cooler, preference is given to a shell-and-tube heat exchanger. In the evaporative cooler, the gaseous vapor formed in the reactor ascends in tubes. A coolant flows around the tubes, and as a result, the vapor condenses.

In the polymer which is produced and is present as pellets, formation of red particles can occur. Furthermore, surface defects can occur in workpieces which are produced from the pellets by injection molding.

DESCRIPTION OF THE INVENTION

It is an object of the invention, in the production of a polymer by means of a reactor and an evaporative cooler, to reduce or avoid the formation of red particles and also of polymer which leads to surface defects in workpieces which are produced from the polymer by injection molding and thus increase the quality of the polymer produced.

This object is achieved according to the invention by a process for producing a polymer from at least one first component and a second component having the features of the claims. The invention relates, in particular, to a process for producing a polymer from at least one first component and a second component by means of a reactor (50), where; heat of reaction arising in the reactor (50) is removed by means of an evaporative cooler (40) by feeding gaseous vapor formed in the reactor (50) to the evaporative cooler (40), wherein a product stream containing condensed vapor is recirculated from the evaporative cooler (40) via a separator vessel (60) into the reactor (50) and an aqueous phase is separated off from the product stream in the separator vessel (60).

In a generic process for producing a polymer from at least one first component and a second component by means of a reactor, heat of reaction arising in the reactor is removed by means of an evaporative cooler by feeding gaseous vapor formed in the reactor to the evaporative cooler.

According to the invention, a product stream containing condensed vapor is recirculated from the evaporative cooler via a separator vessel to the reactor, and an aqueous phase is separated off from the product stream in the separator vessel. The aqueous phase here settles at the bottom of the separator vessel. The product stream which leaves the separator vessel above the aqueous phase is thus fed to the reactor.

It has surprisingly been found that the formation of red particles and of further constituents leading to surface defects in workpieces which are produced from the polymer by injection molding can be reduced when the product stream from the evaporative cooler is conveyed via the separator vessel and the aqueous phase is separated off from the product stream before the product stream is recirculated with the condensed vapor into the reactor. In addition, less fouling and deposits of polymer are formed in the reactor.

The first component and the second component from which the (co)polymer is produced contain or consist of, in particular, monomers. Such monomers are, for example, firstly styrene and/or alpha-methylstyrene and secondly acrylonitrile and/or methacrylic esters (such as methyl methacrylate).

The process of the invention can be used advantageously for producing styrene-acrylonitrile copolymer (SAN). In this case, the first component contains styrene (or consists thereof), and the second component contains acrylonitrile (or consists thereof). Preferred mixing ratios (w/w) are from 90 parts of styrene:10 parts of acrylonitrile to 60 parts of styrene:40 parts of acrylonitrile.

The process of the invention can also advantageously be used for producing alpha-methylstyrene-acrylonitrile copolymer (AMSAN). In this case, the second component contains acrylonitrile and the first component contains alpha-methylstyrene. Preferred mixing ratios here are from 80 parts of alpha-methylstyrene:20 parts of acrylonitrile to 60 parts of alpha-methylstyrene:40 parts of acrylonitrile.

The process of the invention can also advantageously be used for producing styrene-methyl methacrylate copolymer (SMMA). In this case, the first component contains styrene and the second component contains methyl methacrylate (MMA).

It is also conceivable for more than two components, or more than two monomers, to be used. In particular, terpolymers composed of three monomers can be produced by means of the process of the invention.

For example, a terpolymer composed of the monomers acrylonitrile, styrene and alpha-methylstyrene can be produced by means of the process of the invention.

In an advantageous embodiment of the invention, the product stream is cooled, in particular in a heat exchanger, before entry into the separator vessel.

In a preferred embodiment of the invention, a separation layer formed directly above the aqueous phase is also separated off together with the aqueous phase from the product stream in the separator vessel. The product stream which leaves the separator vessel from above the separation layer is fed to the reactor.

In a preferred further development of the invention, the first component and/or the second component are at least partly fed via the evaporative cooler and the first component and/or second component introduced into the evaporative cooler go from the evaporative cooler via the separator vessel into the reactor.

Preferably, the first component and/or the second component are at least partly introduced from above through a cap of the evaporative cooler into the evaporative cooler. The cap of the evaporative cooler is arranged in an upper region and closes the evaporative cooler off at the top. The first component and/or the second component are thus introduced under the force of gravity into the evaporative cooler and drop under the force of gravity into the evaporative cooler.

Preferably, the first component and/or the second component are at least partly introduced from above into a plurality of vertical tubes of the evaporative cooler. The vapor ascending from the reactor condenses in these tubes. The first component and/or the second component are thus introduced into the evaporative cooler in such a way that the first component and/or the second component drop into said tubes.

In another advantageous embodiment of the invention, the first component and/or the second component are also partly introduced directly into the reactor. The first component and/or the second component are particularly preferably introduced at least partly in liquid form into the evaporative cooler and/or the reactor. The first component and/or the second component thus flow into the evaporative cooler and/or into the reactor.

For example, the first component and/or the second component are at least partly mixed with a solvent. Solvents used are, for example, ethylbenzene (EB) and toluene. A further suitable solvent is methyl ethyl ketone. The solvent may be taken off from a condensation unit arranged downstream of the reactor, preferably via a collection vessel. Unreacted monomers of the first component and of the second component may also be taken off from the condensation unit, preferably via the collection vessel.

In an advantageous embodiment of the invention, the solvent, after condensation, and condensed, unreacted monomers of the first component and/or of the second component are recirculated from the condensation unit via a return conduit to the evaporative cooler. The solvent is thus continually circulated.

The gaseous vapor formed in the polymerization taking place in the reactor ascends against the force of gravity in the vertical tubes of the evaporative cooler and condenses in the evaporative cooler. The product stream which contains condensed vapor and possibly the first component and/or the second component subsequently preferably flows under the force of gravity into the separator vessel. The product stream leaving the separator vessel likewise preferably flows under the force of gravity into the reactor.

The object is also achieved according to the invention by a system for producing a polymer from at least one first component and a second component having the following features, comprising:

a reactor (50) and an evaporative cooler (40) for removing heat of reaction arising in the reactor (50), characterized in that a separator vessel (60) is arranged between the evaporative cooler (40) and the reactor (50) in such a way that a product stream containing condensed vapor is recirculated from the evaporative cooler (40) via the separator vessel (60) into the reactor (50).

A generic system for producing a polymer from at least one first component and a second component comprises a reactor in which the polymerization takes place and an evaporative cooler for removing heat of reaction arising in the reactor.

The reactor is connected to the evaporative cooler in such a way that heat of reaction arising in the reactor is removed by means of the evaporative cooler by feeding gaseous vapor formed in the reactor to the evaporative cooler.

According to the invention, a separator vessel is arranged between the evaporative cooler and the reactor in such a way that a product stream containing condensed vapor is recirculated from the evaporative cooler, in particular from the bottom of the evaporative cooler, via the separator vessel into the reactor. The separator vessel here serves to separate off an aqueous phase from the product stream.

In an advantageous embodiment of the invention, a heat exchanger is arranged between the evaporative cooler and the separator vessel in such a way that the product stream is cooled in the heat exchanger before entry into the separator vessel.

In an advantageous development of the invention, the evaporative cooler has at least one feed opening for introducing the first component and/or the second component. The first component and/or second component introduced into the evaporative cooler thus go from the evaporative cooler into the reactor.

The at least one feed opening is preferably arranged in a cap of the evaporative cooler. The cap of the evaporative cooler is arranged in an upper region and closes the evaporative cooler off at the top. The first component and/or second component can thus be introduced from above through the cap of the evaporative cooler into the evaporative cooler and drop under the force of gravity into the evaporative cooler.

Preferably, nozzles are installed in the cap of the evaporative cooler. The nozzles are arranged in such a way that the first component and/or second component introduced through the at least one feed opening drop from above into vertical tubes of the evaporative cooler and are preferably distributed over all tubes. The vapor ascending from the reactor condenses in these tubes.

Furthermore, a return conduit for feeding a solvent from a condensation unit arranged downstream of the reactor into the evaporative cooler is advantageously provided. The mixture of solvent and condensed, unreacted monomers therefore flows, at least partly, together with the first component and/or second component into the evaporative cooler.

The reactor, the evaporative cooler and the separator vessel are advantageously arranged in such a way that gaseous vapor formed in the reactor ascends against the force of gravity into the evaporative cooler, condenses there and a product stream containing vapor condensed in the evaporative cooler and optionally the first component and/or the second component, flows under the force of gravity into the separator vessel.

The reactor, the evaporative cooler and the separator vessel are also advantageously arranged in such a way that the product stream flows under the force of gravity from the separator vessel into the reactor.

Styrene-acrylonitrile copolymer (SAN), alpha-methylstyrene-acrylonitrile copolymer (AMSAN) or styrene-methyl methacrylate copolymer (SMMA), in particular, but also other polymers and copolymers can be advantageously produced by means of the process of the invention and by means of the system of the invention.

The polymer produced by means of the process of the invention may advantageously be mixed with rubber and/or polycarbonate (PC) and/or polyamide (PA).

Embodiments of the invention are explained in more detail with the aid of the following drawing, the following description and the claims.

Figure 1:
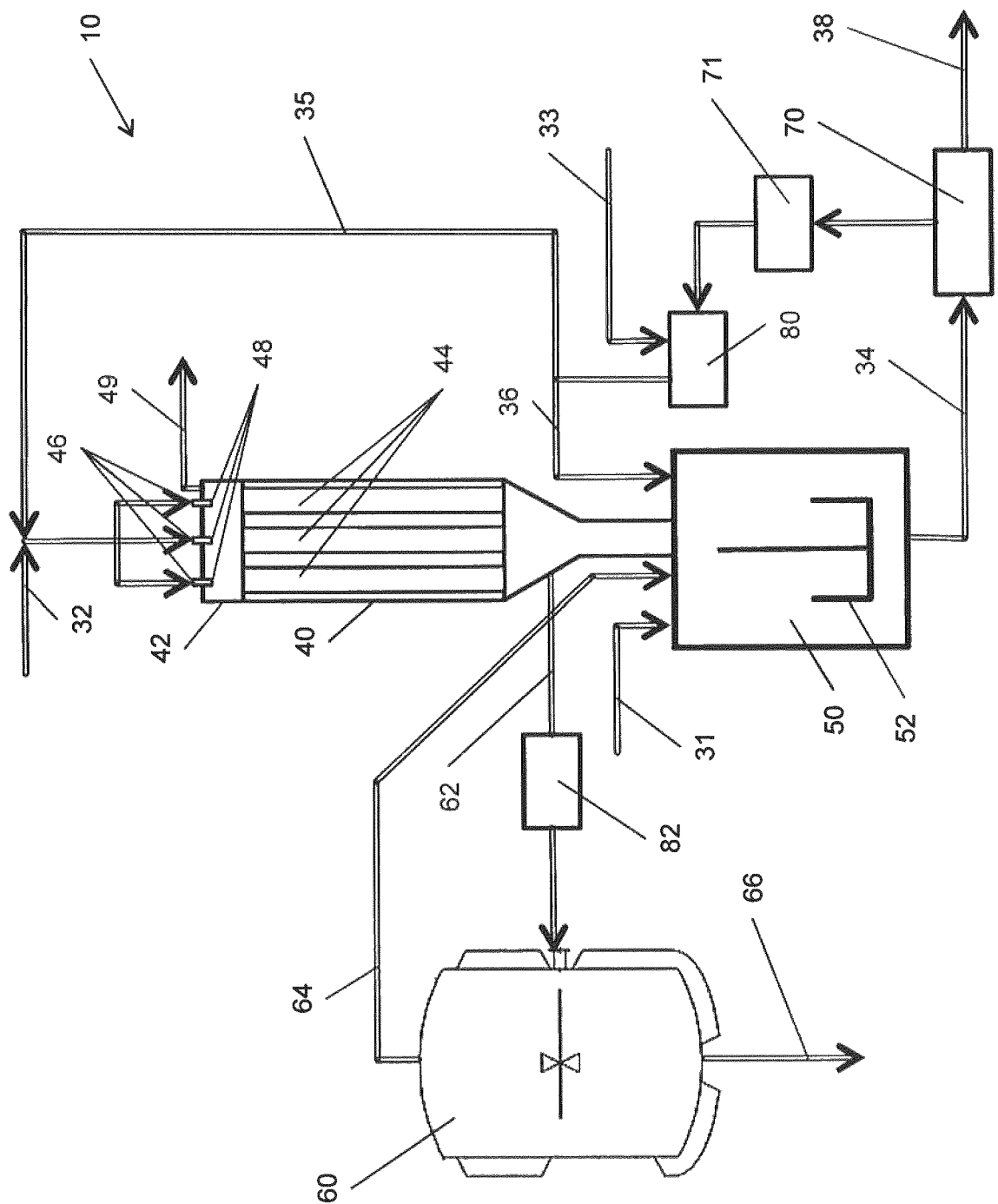
FIG. 1: shows a schematic view of a system for producing a polymer.

A schematic sectional view of a system 10 for producing a polymer from at least one first component and a second component is depicted in FIG. 1.

The system 10 serves, in particular but not exclusively, for producing styrene-acrylonitrile copolymer (SAN), alpha-methylstyrene-acrylonitrile copolymer (AMSAN) and styrene-methyl methacrylate copolymer (SMMA).

The system 10 comprises a reactor 50. In the reactor 50, a polymerization of monomers fed in takes place. A stirrer 52 is arranged within the reactor 50. The stirrer 52 can be driven rotationally by means of an electric motor which is not shown here. Other types of reactors 50 in which a polymerization of monomers fed in can take place can also be used.

A first feed conduit 31 is connected to the reactor 50. The first feed conduit 31 serves for the introduction of components directly into the reactor 50. The components introduced contain, in particular, monomers. A first return conduit 36 is also connected to the reactor 50. The first return conduit 36 serves for the introduction of a solvent and also of unreacted monomers separated off during degassing. The solvent originates from a condensation unit 71, which will be discussed at a later juncture.

Furthermore, an outlet conduit 34 is connected to the reactor 50. Polymer composition formed in the reactor 50 can be drained from the reactor by means of the outlet conduit 34. A degassing unit 70 is arranged upstream of the reactor 50 and connected to the outlet conduit 34. Polymer composition drained from the reactor 50 via the outlet conduit 34 thus goes into the degassing unit 70 arranged downstream.

The degassing unit 70 serves, in particular, for removing volatile constituents from the polymer composition, in particular solvent and unreacted monomers. An offtake conduit 38 is connected to the degassing unit 70. The polymer produced, which is now at least largely free of unreacted monomers and solvent, can be taken from the system 10 via the offtake conduit 38.

The degassing unit 70 is also connected to the condensation unit 71. Solvent and unreacted monomers which have been removed from the polymer composition in the degassing unit 70 are fed into the condensation unit 71. The solvent and the unreacted monomers condense in the condensation unit 71.

The condensation unit 71 is connected to a collection vessel 80. The condensed solvent and the condensed, unreacted monomers from the condensation unit 71 are fed into the collection vessel 80.

A feed conduit 33 is also connected to the collection vessel 80 and serves for introducing or introducing further amounts of solvent.

The first return conduit 36 which is connected to the reactor 50 and serves for introduction of the solvent and the unreacted monomers into the reactor 50 is also connected to the collection vessel 80. The solvent present in the collection vessel 80 and also the unreacted monomers can thus be partly recirculated via the first return conduit 36 into the reactor 50.

The system 10 further comprises an evaporative cooler 40. The evaporative cooler 40 serves for removing heat of reaction arising in the polymerization in the reactor 50. The evaporative cooler 40 is in the present case configured as shell-and-tube heat exchanger and comprises a plurality of vertical tubes 44. The evaporative cooler 40 is closed, i.e. at the end facing away from the ground, by a cap 42. Furthermore, the evaporative cooler 40 comprises a coolant inlet which is not shown here and a coolant outlet which is likewise not shown here.

The reactor 50 is connected to the evaporative cooler 40 in such a way that the heat of reaction arising during the polymerization in the reactor 50 can be removed by means of the evaporative cooler 40. Gaseous vapor formed in the reactor 50 is fed to the evaporative cooler 40 and condenses in the evaporative cooler 40.

A separator vessel 60 is arranged between the evaporative cooler 40 and the reactor 50. The separator vessel 60 serves to separate off an aqueous phase from a product stream which contains condensed vapor from the evaporative cooler. The evaporative cooler 40 is connected by means of a separator conduit 62 to the separator vessel 60 and the separator vessel 60 is connected by means of a feed conduit 64 to the reactor 50. The separator vessel 60 is arranged in the system 10 in such a way that the product stream flows under the force of gravity from the evaporative cooler 40 through the separator conduit 62 to the separator vessel 60 and further through the feed conduit 64 back into the reactor 50.

The system 10 also comprises a heat exchanger 82 which is arranged in the separator conduit 62 between the evaporative cooler 40 and the separator vessel 60. The product stream exiting from the evaporative cooler 40 flows through the heat exchanger 82 and is cooled in the heat exchanger 82 before entering the separator vessel 60. The heat exchanger 82 here is optional and can also be omitted. In this case, the product stream exiting from the evaporative cooler 40 flows directly into the separator vessel 60.

The feed conduit 64 is connected to an upper region of the separator vessel 60. The separator conduit 62 is connected to a middle region of the separator vessel 60. An outflow 66, which serves to take off the aqueous phase from the separator vessel 60, is connected to a lower region of the separator vessel 60.

Within the evaporative cooler 40, the gaseous vapor formed in the reactor 50 ascends in the vertical tubes 44. A coolant flows around the tubes 44.

The coolant is fed to the evaporative cooler 40 through the coolant inlet, flows around the vertical tubes 44 and exits again from the evaporative cooler 40 through the coolant outlet. In the process, the coolant cools the tubes 44 and also vapor from the reactor 50 which is present therein. As a result, the vapor condenses, and a product stream comprising the condensed vapor flows through the separator conduit 62 into the separator vessel 60.

One or more feed openings 46 are arranged in the cap 42 of the evaporative cooler 40. The feed openings 46 in the cap 42 of the evaporative cooler 40 serve for introducing components into the evaporative cooler 40. Furthermore, a plurality of nozzles 48 can be provided in the cap 42 of the evaporative cooler 40. The nozzles 48 are connected to the feed openings 46. Components which are introduced into the cap 42 of the evaporative cooler 40 through the feed openings 46 thus go to the nozzles 48 in the cap 42 of the evaporative cooler 40.

The nozzles 48 are arranged in the cap 42 of the evaporative cooler 40 in such a way that components which are introduced through the feed openings 46 into the evaporative cooler 40 are distributed from above over all vertical tubes 44 of the evaporative cooler 40. The components introduced through the feed openings 46 into the evaporative cooler 40 thus drop under the force of gravity into the vertical tubes 44 of the evaporative cooler 40 in which the vapor from the reactor 50 condenses.

A second feed conduit 32 is connected to the cap 42 of the evaporative cooler 40. The second feed conduit 32 serves for introduction of components into the evaporative cooler 40. The components fed in contain in particular monomers. The second feed conduit 32 is connected to the feed openings 46 in the cap 42 of the evaporative cooler 40.

Components introduced via the second feed conduit 32 thus go via the feed openings 46 to the nozzles 48 in the cap 42 of the evaporative cooler 40 and from there into the vertical tubes 44.

A second return conduit 35 opens into the second feed conduit 32. The second return conduit 35 is, like the first return conduit 36, connected to the collection vessel 80. Thus, the solvent present in the collection vessel 80 and also the unreacted monomers can be fed in their entirety or partly into the second feed conduit 32 via the second return conduit 35. The second return conduit 35 thus serves for introduction of a solvent and of the unreacted monomers into the evaporative cooler 40.

Furthermore, an offgas conduit 49 is connected to an upper side of the cap 42 of the evaporative cooler 40. Offgases from the evaporative cooler 40 can exit via the offgas conduit 49.

Figure 2:
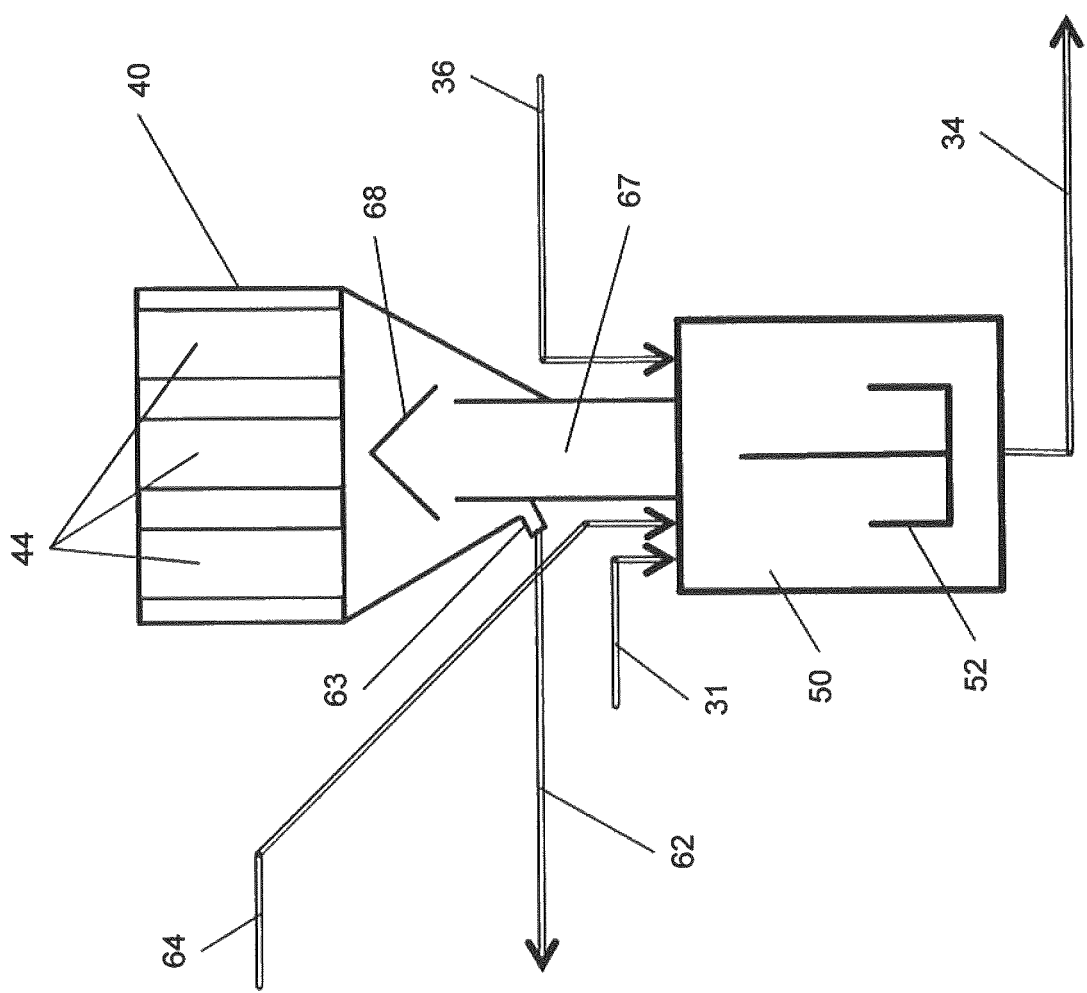
FIG. 2: shows a detailed schematic view of a bottom region of the evaporative cooler of the system for producing a polymer from FIG. 1.

FIG. 2 shows a detailed schematic depiction of a lower region of the evaporative cooler 40 of the system 10 for producing a polymer shown in FIG. 1. Here, in particular, the lower region of the evaporative cooler 40, which is located below the tubes 44 and to which the separator conduit 62 and the reactor 50 are connected, is shown.

The lower region of the evaporative cooler 40 has an approximately funnel shape. A riser tube 67 extends from the reactor 50 into the funnel-shaped lower region of the evaporative cooler 40. A cover 68 is arranged above the riser tube 67 and below the tubes 44. The cover 68 is configured in such a way that vapor flowing downward under the force of gravity from the tubes 44 and also monomers impinge on the cover 68 and are diverted laterally to an interior wall of the funnel-shaped lower region. The cover 68 thus prevents vapor flowing downward under the force of gravity from the tubes 44 and also monomers from falling into the riser tube 67 and flowing into the reactor 50.

A discharge port 63 is installed at an outer wall of the funnel-shaped lower region of the evaporative cooler 40. The separator conduit 62 is connected to the discharge port 63. The vapor flowing downward under the force of gravity from the tubes 44 and also monomers flow through the discharge port 63 as product stream into the separator conduit 62 and further to the separator vessel 60.

In the reactor 50, a polymerization of the monomers takes place while stirring by means of the stirrer 52. Heat of reaction arises in the polymerization. The heat of reaction results in gaseous vapor ascending from the reactor 50 into the evaporative cooler 40. The gaseous vapor formed in the reactor 50 ascends in the vertical tubes 44 of the evaporative cooler 40 and is cooled there. As a result, the vapor condenses, and the product stream comprising the condensed vapor flows to the separator vessel 60.

The polymer composition formed in the polymerization has a solids content of about 50%-80%, preferably 60%-70%. The polymer composition is then fed via the outlet conduit 34 to the degassing unit 70. In the degassing unit 70, the volatile constituents, in particular solvent and unreacted monomers, are removed from the polymer composition. The polymer produced, which is now largely free of volatile constituents, is taken off from the system 10 via the offtake conduit 38.

The solvent removed from the polymer composition and also the unreacted monomers are conveyed through the condensation unit 71 and the collection vessel 80 and possibly partly recirculated via the first return conduit 36 back into the reactor 50 or recirculated in their entirety or partly via the second return conduit 35 back into the evaporative cooler 40.

The components are present in liquid form. The components are introduced through the feed openings 46 in the cap 42 of the evaporative cooler 40 into the evaporative cooler 40. The components are distributed into the vertical tubes 44 of the evaporative cooler 40 via the nozzles 48 in the cap 42 of the evaporative cooler 40. Here, the components drop from above under the force of gravity into the vertical tubes 44 of the evaporative cooler 40.

Due to the heat of reaction which arises as a result of the polymerization in the reactor 50, gaseous vapor also ascends against the force of gravity from the reactor 50 into the vertical tubes 44 of the evaporative cooler 40. There, the vapor is cooled and condenses. In the process, mixing of the condensed vapor with the components which are introduced from above under the force of gravity via the second feed conduit 32 into the vertical tubes 44 of the evaporative cooler 40, and with substances introduced via the second return conduit 35 takes place.

The condensed vapor subsequently flow together with the components introduced via the second feed conduit 32 into the evaporative cooler 40 and together with the substances fed via the second return conduit 35 as product stream under the force of gravity from the evaporative cooler 40 to the separator vessel 60.

In the separator vessel 60, an aqueous phase settles at the bottom, and a separation layer is formed directly above the aqueous phase. The aqueous phase is, optionally together with the separation layer, drained through the outflow 66 from the separator vessel 60. The aqueous phase and the separation layer are thus separated off from the product stream which contains the condensed vapor and the components introduced into the evaporative cooler 40.

A product stream which contains virtually exclusively condensed vapor, components introduced into the evaporative cooler 40, i.e. monomers, and also solvent is fed via the feed conduit 64 under the force of gravity to the reactor 50. The feed conduit 64 here is attached to the separator vessel 60 above the aqueous phase. The product stream thus leaves the separator vessel 60 from above the aqueous phase.

The process described here for producing a polymer is based on a continuous procedure. The components are introduced continuously in their entirety or at least partly via the second feed conduit 32 into the evaporative cooler 40, or not more than partly introduced via the first feed conduit 31 into the reactor 50. Monomers which are introduced via the first feed conduit 31 into the reactor 50 or via the second feed conduit 32 into the evaporative cooler 40 and which are not recirculated via the degassing unit 70 and the condensation unit 71 are also referred to as fresh monomers.

The polymer produced is likewise taken off continuously via the offtake conduit 38. The solvent is circulated in the system 10. The solvent is at most partly conveyed from the condensation unit 71 via the first return conduit 36 into the reactor 50 or via the second return conduit 35 in its entirety or partly into the evaporative cooler 40.

The invention is explained in more detail by the examples, figures and claims.

In a process known from the prior art for producing a polymer (SAN), the vapor condensed in the evaporative cooler 40 was recirculated together with solvent and unreacted monomers directly into the reactor 50.

The polymer produced was taken off continuously and subsequently processed further to produce pellets. After about six months, surface defects were observed on workpieces which had been produced from the pellets produced by injection molding. Subsequent inspection of the reactor revealed deposits and foulings on the shaft of the stirrer 52 and also on parts of the wall of the reactor 50. Operation was continued without cleaning.

After a further about 3 to 6 months, red particles were also found in the pellets. Subsequent inspection of the reactor 50 showed not only a further increase in the abovementioned deposits and foulings but also proportions of reddish material within the deposits and foulings. To eliminate these undesirable constituents, the reactor 50 had to be cleaned.

In an experiment for producing a polymer (SAN) by means of the process of the invention in a system 10 according to the invention, the product stream was recirculated from the evaporative cooler 40 via the separator vessel 60 into the reactor 50. The polymer produced was taken off continuously and subsequently processed further to produce pellets.

In the present case, it took about two years before surface defects were observed on workpieces which had been produced from the pellets produced by injection molding. Red particles were not found in the pellets within two years. After about two years, an inspection of the reactor 50 was likewise carried out. Here, only small amounts of foulings and deposits of polymer were found on the shaft of the stirrer 52 and on the walls of the reactor 50.

LIST OF REFERENCE NUMERALS

10 System
31 First feed conduit
32 Second feed conduit
33 Feed conduit
34 Outlet conduit
35 Second return conduit
36 First return conduit
38 Offtake conduit
40 Evaporative cooler
42 Cap
44 Tube
46 Feed opening
48 Nozzle
49 Exhaust gas conduit
50 Reactor
52 Stirrer
60 Separator vessel
62 Separator conduit
63 Discharge port
64 Feed conduit
66 Outflow
67 Riser tube
68 Cover
70 Degassing unit
71 Condensation unit
80 Collection vessel
82 Heat exchanger

The invention claimed is:

1. A process for producing a (co)polymer from at least one first component and a second component by a reactor, where heat of reaction arising in the reactor is removed by an evaporative cooler,
by feeding gaseous vapor formed in the reactor to the evaporative cooler wherein
a product stream containing condensed vapor is recirculated from the evaporative cooler via a separator vessel to the reactor, wherein
the product stream is cooled in a heat exchanger before entry into the separator vessel, wherein
an aqueous phase is separated off from the product stream in the separator vessel and wherein
the product stream flows from the separator vessel under the force of gravity into the reactor.

2. The process of claim 1, wherein the first component contains styrene and wherein the second component contains acrylonitrile.

3. The process of claim 1, wherein the second component contains acrylonitrile and wherein the first component contains alpha-methylstyrene.

4. The process of claim 1, wherein the first component contains styrene and wherein the second component contains methyl methacrylate.

5. The process of claim 1, wherein in the separator vessel a separation layer formed above the aqueous phase is separated off from the product stream.

6. The process of claim 1, wherein the first component and/or the second component are introduced at least partly via the evaporative cooler and goes via the separator vessel from the evaporative cooler into the reactor.

7. The process of claim 1, wherein the first component and/or the second component are partly introduced directly to the reactor.

8. The process of claim 6, wherein the first component and/or the second component are fed at least partly in liquid form to the evaporative cooler and/or the reactor.

9. The process of claim 6, wherein solvents and also unreacted monomers of the first component and/or the second component are recirculated from a condensation unit via a return conduit into the evaporative cooler.

10. A system for producing a polymer from at least one first component and a second component, comprising:
a reactor and;

an evaporative cooler for removing heat of reaction arising in the reactor, wherein a separator vessel is arranged between the evaporative cooler and the reactor in such a way that a product stream containing condensed vapor is conveyed from the evaporative cooler via the separator vessel back into the reactor, wherein a heat exchanger is arranged between the evaporative cooler and the separator vessel in such a way that the product stream is cooled in the heat exchanger before entry into the separator vessel, and wherein the reactor, the evaporative cooler, and the separator vessel are arranged in such a way that the product stream flows from the separator vessel under the force of gravity into the reactor.

11. The system of claim 10, wherein the evaporative cooler has at least one feed opening for introducing the first component and/or the second component.

12. The system of claim 10, wherein the reactor, the evaporative cooler, and the separator vessel are arranged in such a way that vapor formed in the reactor ascends against the force of gravity into the evaporative cooler, and wherein the product stream flows under the force of gravity into the separator vessel.

13. The process of claim 7, wherein the first component and/or the second component are fed at least partly in liquid form to the evaporative cooler and/or the reactor.

14. The process of claim 7, wherein solvents and also unreacted monomers of the first component and/or the second component are recirculated from a condensation unit via a return conduit into the evaporative cooler.

15. The process of claim 8, wherein solvents and also unreacted monomers of the first component and/or the second component are recirculated from a condensation unit via a return conduit into the evaporative cooler.

* * * * *